US009304231B2

(12) United States Patent
Salazar

(10) Patent No.: US 9,304,231 B2
(45) Date of Patent: Apr. 5, 2016

(54) HEAT FUSIBLE OIL GELS

(71) Applicant: KRATON POLYMERS U.S. LLC, Houston, TX (US)

(72) Inventor: Lydia Salazar, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 81 days.

(21) Appl. No.: 14/172,119

(22) Filed: Feb. 4, 2014

(65) Prior Publication Data
US 2015/0219796 A1  Aug. 6, 2015

(51) Int. Cl.
*G02B 6/44* (2006.01)
*G02B 1/04* (2006.01)

(52) U.S. Cl.
CPC .............. *G02B 1/046* (2013.01); *G02B 6/4429* (2013.01); *C08L 2203/202* (2013.01); *G02B 6/4483* (2013.01); *Y10T 83/0443* (2015.04)

(58) Field of Classification Search
CPC ............................ G02B 6/4429; G02B 6/4494
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 4,509,821 A | 4/1985 | Stenger |
| 4,788,361 A | 11/1988 | Olson et al. |
| 4,870,117 A | 9/1989 | Levy |
| 5,360,350 A | 11/1994 | Koblitz et al. |
| 5,412,022 A | 5/1995 | Andres et al. |
| 5,737,469 A | 4/1998 | Costello et al. |
| 5,900,455 A | 5/1999 | Breuer et al. |
| 6,424,771 B1 | 7/2002 | Sheu |
| 6,492,469 B2 | 12/2002 | Willis et al. |
| 6,881,776 B2 | 4/2005 | Butuc |
| 7,994,256 B2 | 8/2011 | St. Clair |
| 2009/0186958 A1 | 7/2009 | St. Clair |
| 2012/0261156 A1 | 10/2012 | Dower et al. |
| 2015/0030275 A1* | 1/2015 | Tsuna ........................... 384/470 |

FOREIGN PATENT DOCUMENTS

| | | | |
|---|---|---|---|
| CA | 716645 A | 8/1965 | |
| DE | 102004028140 B4 | 1/2006 | |
| EP | 0811864 A1 | 10/1997 | |
| JP | 2015-21117 A * | 2/2015 | ........... C10M 111/04 |
| WO | 0127673 A1 | 4/2001 | |
| WO | 2012017023 A1 | 2/2012 | |
| WO | 2014020007 A1 | 2/2014 | |

OTHER PUBLICATIONS

Kraton Polymers for Oil Modification, Versatile Solutions for Synthetic and Natural Based Oils; 2015.
Foreign communication from a related counterpart application—Search Report, Taiwan Patent Application No. 104103606, Dec. 14, 2015, 2 pages.

* cited by examiner

*Primary Examiner* — Omar R Rojas
(74) *Attorney, Agent, or Firm* — Clements Bernard PLLC; Leslie Streeter

(57) ABSTRACT

The present invention is directed to a composition for a gel useful in fiber optic cable which has the normal consistency of a grease but which, if desired, will become a rubbery coherent gel upon heating; a method of making the heat-fusible gel, and a method of making a spliceable fiber optic cable, and a fiber optic cable. In the broadest sense, a heat-fusible oil gel composition for fiber optic cable is disclosed, comprising: from 50 to 80 wt. % of a grease-like gel based on a hydrocarbon oil containing from 2 to 10 wt. % of an S-EB or S-EP diblock polymer, or a mixture of these diblock copolymers, and from 20 to 50 wt. % of a grease-like gel based on a polar oil containing from 5 to 25 wt. % of an S-EB-S or S-EP-S triblock copolymer, or a mixture of these triblock copolymers.

19 Claims, No Drawings

HEAT FUSIBLE OIL GELS

BACKGROUND OF THE INVENTION

1. Field of the Invention

Oil gel compositions which have grease-like consistency at ambient temperature but which can be converted to have rubbery consistency by heating are formed by the combination of a grease-like gel in hydrocarbon oil and a grease-like gel in polar oil. The hydrocarbon oil gels are composed of styrenic diblock copolymers and mineral oil. The polar oil gels are composed of styrenic triblock copolymers in particular polar oils. The combinations of these two gels give the novel gels which have grease-like consistency at ambient temperature. When these two gels are combined in certain proportions and are heated, the styrenic triblock copolymer forms an elastic network, converting the gel from a grease-like consistency to a cohesive, rubbery gel. These cohesive oil gels can be formed upon demand by heating the final construction to a temperature around 120-150° C. and as such are referred to as "phase change" oil gels. These oil gels will be useful for a variety of applications including cable filling. In that particular application the oil gel will initially be easily pumpable, which is important in a cable filling operation. The gel will be controllably and locally solidified to make cutting and splicing operations cleaner and more efficient.

The present invention also comprises a method of making the oil gel composition and a method of making an optical fiber cable, as well as a fiber optic cable filled with the phase change oil gel.

2. Prior Art

In U.S. Pat. No. 5,900,455 discloses ground, neat polymer mixed with oil to make a paste that would fuse when heated.

U.S. Pat. No. 6,881,776 discloses two-phase gel compositions obtained by mixing a gelled ester composition comprising a mixture of: 1) an ester compound and a polymer compound selected from the group consisting of triblock copolymers, star polymers, radial polymers, multi-block copolymers, and a combination thereof, and 2) a hydrophobic, non polar solvent.

U.S. Pat. No. 7,994,256 discloses elastosols that can be handled as a paste at ambient temperatures, but which fuses at high temperature to become a cohesive, elastic composition. These compositions have utility as heat fusible sealants and caulks as well as elastomeric coatings. The solid rubbery gels are useful in a variety of applications, such as filling compounds for waterproofing copper cable and air fresheners. The solid rubbery gels have advantages over the prior art in that they can be prepared at ambient temperature, thereby simplifying the process for making and applying them.

U.S. Pat. No. 6,424,771 discloses a cable that includes a core comprising a plurality of coated optical fibers and a filling composition of matter that is disposed about the fibers. Typically, the fibers and the filling material are disposed within a tubular member that is disposed within a sheath system. The filling composition that fills interstices in the core is one that includes a mineral oil constituent that is a relatively high molecular weight aliphatic hydrocarbon. A relatively small percent by weight of a stereochemically hindered antioxidant system is used to prevent thermal oxidative degradation of the filling material. Such stereochemically hindered antioxidants will not migrate out of filling material into other cable and fiber materials, thereby increasing their effectiveness. A styrene-ethylene/propylene (S-EP) diblock copolymer is also included in order to reduce oil separation of the filling material. The diblock polymer and mineral oil form a gel that has grease-like consistency and therefore allows the optical fiber to move within the cable and yet if the cable is cut or breached, the gel repels any water.

U.S. Pat. No. 5,737,469 discloses a gel composition comprising a mineral oil and hydrogenated styrenic block copolymer that makes a gel for the optical fiber cable industry. Optional components are a thixotropic agent and an antioxidant.

The problem with optical fiber cables (FOC) comes when it is time to cut and splice them. Prior art gels having the consistency of grease are used in FOC to prevent ingress of water. They are made by thickening hydrocarbon oil with an S-EP diblock polymer. The grease-like consistency of the gel is an advantage in that it allows the fragile glass fibers to move within the sheath. However, it is a disadvantage if the cable needs to be repaired or spliced because the grease is difficult to remove from the fibers and coats every part of the cable and everything it comes in contact with like tools. It would be highly desirable to, on demand, convert the grease-like gel into a cohesive rubbery gel which could be easily stripped off the fibers yet stay in place. The present invention overcomes this problem with prior art gels.

SUMMARY OF THE INVENTION

The approach is to make a gel which is a dispersion of an S-EB-S triblock polymer in appropriate polar oil and use it as an additive to a conventional FOC oil gel. Since the polar oil is incompatible with the EB block, the S-EB-S triblock in the polar gel is in dispersion form, and so it will not change the consistency of the conventional gel until the modified gel is heated, allowing the triblock to access the hydrocarbon oil in the gel and thereby forming a gel which is cohesive and rubbery at ambient temperature. The present invention is directed to a composition for a gel useful in fiber optic cable; a method of making the gel, and a method of making a spliceable fiber optic cable, and a fiber optic cable.

In the broadest sense, a heat-fusible oil gel composition for fiber optic cable is disclosed, comprising:
  from 50 to 80 wt. % of a grease-like gel based on a hydrocarbon oil containing from 2 to 10 wt. % of an S-EB or S-EP diblock polymer, or a mixture of these diblock copolymers, and
  from 20 to 50 wt. % of a grease-like gel based on polar oil containing from 5 to 25 wt. % of an S-EB-S or S-EP-S triblock copolymer, or a mixture of these triblock copolymers, where S, EB and EP represent blocks of polystyrene, hydrogenated polybutadiene and hydrogenated polyisoprene, respectively.

In the broadest sense, a method of producing a heat fusible oil gel composition for fiber optic cable is disclosed, comprising:
  a) making a grease-like gel based on a hydrocarbon oil by mixing from 2 to 10 wt. % of a diblock polymer into the hydrocarbon oil for about 30-60 minutes at about 120-140° C. with a high shear mixer,
  b) making a grease-like gel based on a polar oil by mixing from 5 to 25 wt. % of a triblock polymer into the polar oil for about 30-60 minutes at about 120-140° C. with a high shear mixer, and
  c) mixing about 50 to about 80 wt. % of the gel based on hydrocarbon oil and about 20 to about 50 wt. % of the gel based on polar oil at near room temperature with a low shear mixer.

In the broadest sense, a method of producing a spliceable fiber optic cable is disclosed, comprising:
  placing a fiber optic waveguide into a flexible sleeve, filling said sleeve with said heat fusible oil gel composition comprising 50-80 wt. % of a hydrocarbon oil gel containing from 2-10 wt. % of an S-EB or S-EP diblock polymer or a mixture thereof, and from 20-50 wt. % of a polar oil gel containing 5-25 wt. % of an S-EB-S or S-EP-S triblock polymer, or a mixture of these, wherein said heat fusible oil gel is positioned between the at least one fiber optic waveguide and the flexible sheath.

In the broadest sense, a method of splicing a fiber optic cable that can be easily spliced without spilling oil is disclosed, comprising:

placing a fiber optic waveguide into a flexible sleeve, filling said sleeve with said heat fusible oil gel composition comprising 50 to 80 wt. % of a grease-like hydrocarbon oil gel containing from 2-10 wt. % of an S-EB or S-EP diblock polymer or a mixture thereof, and from 20-50 wt. % of a grease-like polar oil gel containing 5-25 wt. % of an S-EB-S or S-EP-S triblock polymer, or a mixture of these, heating said filled sleeve in an area where the optic fiber waveguide and sleeve are to be cut, when it is desirable to splice the optic fiber cable, until said heat fusible oil gel composition solidifies, changing from grease-like to cohesive and rubbery, and cutting said optic fiber waveguide and sleeve in said solidified area to splice it to another spliceable fiber optic cable.

A fiber optic cable of the present invention comprising at least one fiber optic waveguide, a flexible sheath surrounding said optic fiber waveguide, and a heat fusible oil gel comprising from 50-80 wt. % of a grease-like hydrocarbon oil gel containing from 2-10 wt. % of an S-EB or S-EP diblock polymer or a mixture of these and from 20-50 wt. % of a grease-like polar oil gel containing 5-25 wt. % of an S-EB-S or S-EP-S triblock polymer, or a mixture of these, wherein said heat fusible oil gel is positioned between the at least one fiber optic waveguide and the flexible sheath.

DESCRIPTION OF THE PREFERRED EMBODIMENTS

The ranges set forth in this specification include not only each end number but also every conceivable number in between the end numbers, as this is the very definition of a range.

The hydrogenated styrenic block copolymers are a critical part of the present invention. These polymers can be polymerized using, to a great extent, known and previously employed methods and materials. In general, the polymers are prepared by the process known as anionic polymerization using known selections of adjunct materials, including polymerization initiators, solvents, promoters, and structure modifiers. Such copolymerization can be conducted as a batch, semi-batch, or continuous preparation, with batch being most preferred.

The polymerization is carried out in a solvent which can be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the hydrogenated styrenic block copolymers of the present invention include the initial monomers. The monoalkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, butadiene and isoprene are most preferred. As used herein, and in the claims, "butadiene" refers specifically to "1,3-butadiene".

Other important starting materials for anionic copolymerizations include one or more polymerization initiators. In the present invention these include, for example, alkyl lithium compounds such as s-butyllithium, n-butyllithium, t-butyllithium, amyllithium and the like, and di-initiators such as the di-s-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° to about 150° C., more preferably about 10 to about 100° C., and most preferably, in view of industrial limitations, about 300 to about 90° C. It is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As used herein, "styrenic block copolymer" is defined as a block copolymer having at least a first block of one or more monoalkenyl arenes, such as styrene and a second block of a conjugated diene such as butadiene or isoprene. The method to prepare this block copolymer is via any of the methods generally known for block polymerizations. The present invention includes as embodiments copolymer compositions, which may be either diblock or triblock copolymers. In the case of the diblock copolymer composition, one block is the monoalkenyl arene and polymerized therewith is a second block of a conjugated diene which is hydrogenated in a post-polymerization process. In the case of the triblock composition, it comprises, as endblocks the monoalkenyl arene block polymer and as a midblock a block polymer of conjugated diene which is hydrogenated in a post-polymerization process. Where a triblock copolymer composition is prepared, the hydrogenated conjugated diene is designated as "B" and the monoalkenyl arene block polymer designated as "A". The A-B-A triblock compositions can be made by either sequential polymerization or coupling. In the sequential polymerization technique, the monoalkenyl arene is polymerized first, followed by addition of the conjugated diene block to form the midblock, and then followed by addition of more monoalkenyl arene to form the terminal block. In addition to the sequential A-B-A configuration, the A-B diblock can be coupled to form (A-B)$_n$X polymers via a post-polymerization step called "coupling". First the A-B diblock copolymer is formed sequentially as noted above. Then the A-B diblock copolymer "arms" are coupled together. In the above formula, n is an integer from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, esters of monohydric alcohols with dicarboxylic acids, and epoxidized oils. Star-shaped polymers are prepared with polyalkenyl coupling agents as disclosed in, for example, U.S. Pat. Nos. 3,985,830; 4,391,949; and 4,444,953; and Canadian Pat. No. 716,645. Suitable polyalkenyl coupling agents include divinylbenzene, and preferably m-divinylbenzene. Preferred coupling agents are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

An important aspect of the present invention is to control the microstructure or vinyl content of the conjugated diene in the hydrogenated styrenic block copolymer. When butadiene is used for preparation of the styrenic block copolymer, addition can occur at the 1,4 position or at the 1,2 position. The term "vinyl content" refers to the presence of a pendant vinyl group on the polymer chain resulting from 1,2-addition of butadiene. When using butadiene as the conjugated diene, it is preferred that about 30 to about 80 mol percent of the condensed butadiene units in the copolymer block have 1,2 vinyl configuration as determined by proton NMR analysis. This is effectively controlled by varying the relative amount of the distribution agent. Suitable ratios of distribution agent to lithium are disclosed and taught in U.S. Pat. No. Re. 27,145, which disclosure is incorporated by reference.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying reactions. In contrast, chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361 the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

The polymerization procedures described hereinabove, including preparation of the diblock and multi-block copolymers, can be carried out over a range of solids content, preferably from about 5 to about 80 percent by weight of the solvent and monomers, most preferably from about 10 to about 40 weight percent.

Properties of a final triblock polymer are dependent to a significant extent upon the resulting monoalkenyl arene content and conjugated diene content. It is preferred that, to ensure significantly elastomeric performance while maintaining desirably high Tg and strength properties, as well as desirable transparency, the triblock and multi-block polymer's monoalkenyl arene content is greater than about 20% weight, preferably from about 20% to about 80% weight. This means that essentially all of the remaining content is diene.

After the polymers of the present invention have been polymerized, they undergo another post-polymerization treatment, that of hydrogenation of the block copolymer. The preferred hydrogenation is selective hydrogenation of the diene portions of the final block copolymer. Hydrogenation generally improves thermal stability, ultraviolet light stability, oxidative stability, and weatherability of the final polymer.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the monoalkenyl arene double bonds have been reduced. Preferred ranges are at least about 95 percent of the conjugated diene double bonds are reduced, and more preferably about 98 percent of the conjugated diene double bonds are reduced. Alternatively, it is possible to hydrogenate the polymer such that aromatic unsaturation is also reduced beyond the 10 percent level mentioned above.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

It is also important to control the molecular weight of the various blocks, referred to herein as apparent average molecular weights. For an AB diblock, desired block weights are 3.0 to about 60 kg/mol for the monoalkenyl arene A block, and 30 to about 300 kg/mol for the hydrogenated conjugated diene B block. Preferred ranges are 5.0 to 45 kg/mol for the A block and 50 to about 250 kg/mol for the B block. For the triblock, which may be a sequential ABA or coupled (AB)n X block copolymer, the A blocks should be 3.0 to about 60 kg/mol, preferably 5.0 to about 45 kg/mol, while the B block should be about 30 to about 300 kg/mol, and the B blocks for the coupled polymer when n=2, half that amount. The total average molecular weight for the ABA triblock copolymer should be from about 40 to about 400 kg/mol, and for an (AB)$_4$X radial copolymer from about 80 to about 800 kg/mol. With the expression "apparent", as used throughout the specification, is meant the number average molecular weight (Mn) of a polymer as measured with gel permeation chromatography (GPC) also referred to as Size Exclusion Chromatography (SEC) using polystyrene calibration standards (using a method analogous to the method described in ASTM D5296-05. The molecular weight distribution ($M_w/M_n$) for anionically polymerized polymers is small. Therefore, as is common in the art, as number average molecular weight the peak position is used, since the differences between the peak molecular weight ($M_p$) and the number average molecular weight are very small.

The diblock copolymers used to demonstrate the present invention were Kraton G1701 and Kraton G1702. Kraton G1701 is a polystyrene-hydrogenated polyisoprene (S-EP) diblock polymer having a polystyrene content of about 35 wt. % and apparent molecular weight of about 127 kg/mol. Kraton G1702 is an S-EP diblock polymer having a polystyrene content of about 28 wt. % and apparent molecular weight of about 184 kg/mol. The triblock polymers used to demonstrate the present invention were Kraton G1651 and Kraton G1633. Both are polystyrene-hydrogenated polybutadiene-polystyrene (S-EB-S) triblock polymers having a polystyrene content of about 33 and 31 wt. %, respectively and apparent molecular weights of about 270 kg/mol and 470 kg/mol, respectively. Higher molecular weight hydrogenated triblock copolymers work best. Kraton G 1642 also meets this criteria, having a polystyrene content of about 20 wt. %, a vinyl content of about 70 mol.%, and a melt flow rate of 5.1 g/10 min. at 230° C. under 10 kg.

Hydrocarbon oil is used in combination with the S-EP diblock polymer to make a gel having the consistency of grease. The hydrocarbon oil is an aromatic-free oil composed of naphthenic or paraffinic species or a mixture thereof. Suitable hydrocarbon oils are relatively non-polar oils such as mineral oils. Mineral oils are very abundant and are sold under many tradenames. The mineral oil used to demonstrate the present invention was Drakeol 34 from Calumet/Penreco. Other suitable oils are the so-called gas-to-liquid synthetic oils such as the Risella Oils sold by Shell Oil Co. The hydrocarbon oil gel comprises about 90-98 wt. % mineral oil and 2-10 wt. % of S-EP diblock polymer. It may also contain other ingredients like a rheology control agent such as silica like Cabosil TS720 from Cabot Corp or like an antioxidant such as Irganox 1010 from BASF. This hydrocarbon oil gel is typically prepared by mixing at about 130° C. for about 45 minutes with a high shear mixer such as a Silverson rotor/stator type mixer.

Polar oil, such as ether, ester or ketone oil, is used in combination with the S-EB-S triblock polymer to give a gel having the consistency of grease. The polar oils used to demonstrate the present invention were hydroxylated soybean oil, such as Agrol Polyol 2.0 from BioBased Technologies, or an ester of pentaerythritol and linear saturated fatty acid, such as CalEster A from Calumet/Penreco. The preferred polar oil is CalEster A, an ester of pentaerythritol and linear saturated fatty acid. The polar oil gel may contain other ingredients like a rheology control agent such as silica like Cabosil M5 from Cabot Corp or clay like Bentone SD2 from Rheox or like an antioxidant such as Irganox 1010. The polar oil gel is typically prepared using the same equipment and procedure used to prepare the hydrocarbon oil gel.

A suitable heat fusible oil gel composition comprises a hydrocarbon oil gel and a polar oil gel blended at a ratio of 50-80 wt. % of the hydrocarbon oil gel and 20-50 wt. % of the polar oil gel. More preferably the heat fusible oil gel composition comprises 70-80 wt. % hydrocarbon oil gel and 30-20 wt. % polar oil gel. The polar oil gel is very expensive compared to the hydrocarbon oil gel. If the heat fusible oil gel contains less than 20 wt. % of the polar oil gel, the softening point of the gel after heating is too low or the heat fusible gel will not change from being grease-like to cohesive and rubbery when heated. If the heat fusible oil gel contains more than 50 wt. % of the polar oil gel, the composition becomes more expensive and may not be phase stable.

Thixotropic agents used as rheology control additives may optionally used to maintain the gel in a stable form. Typical acceptable thixotropic agents are silicas and clays. Silicas such as fumed silica, precipitated silica, or colloidal silica, or a mixture thereof are suitable. Preferred is fumed silica. Clays such as bentonite, kaolin, and ceramic, or mixtures thereof are suitable thixotropic agents. If the polar oil gels of this invention are made and used straight away, no thixotropic agent is needed. If the polar oil gels of the present invention are to be stored several months, thixotropic agents are generally employed to retard the rate of separation of the polymer from the oil. In the hydrocarbon oil gel formulation, a hydrophobic fumed silica such as Cabosil TS728 from Cabot Corp is employed in a range from 0 to about 7.5 wt. % based on the weight of the hydrocarbon oil gel composition, and preferably between 5-6 wt. % based on the hydrocarbon oil gel. For the polar oil gel, a hydrophilic fumed silica such as Cabosil M5 from Cabot Corp is employed in a range from 0 to about 2.5 wt. % based on the weight of the polar oil gel, and preferably around 1.5 wt. % based on the weight of the polar oil gel.

Lastly an optional antioxidant may be employed in both the hydrocarbon oil gel and in the polar oil gel. A typical phenolic antioxidant is Irganox 1010 from BASF. This optional component is generally present in a range of 0.1 to 2.0 wt. % in each of the two gels.

The method of making a heat fusible oil gel comprises mixing the hydrocarbon oil gel and polar oil gel separately at about 120-140° C., preferably about 130° C. and then mixing these two gels together in the appropriate proportions at near room temperature to give the gel which has grease-like consistency but which can be fused by heating to become a cohesive, rubbery gel. A preferred procedure to make the hydrocarbon oil gel and the polar oil gel is to weigh the oil, antioxidant and block copolymer into a rotor/stator type mixer such as a Silverson L4 mixer and begin heating with the mixer rotating at about 2,000 rpm. When the oil temperature reaches about 120-140° C., preferably about 130° C., increase the mixer speed to about 6,000 rpm and continue mixing until the polymer is completely dissolved in the oil, usually 30-60 minutes. Both the hydrocarbon oil gel and the polar oil gel are cooled to room temperature preferably under vacuum to eliminate bubbles in the gel. These two gels are then mixed together at the desired proportions at near room temperature. High shear mixing is not required for this last step. The two gels can be mixed manually in a container or using even simple equipment that can handle the relatively high viscosity of the gel which will have grease-like consistency.

A method of making a spliceable fiber optic cable comprises placing a fiber optic waveguide into a flexible sleeve or sheath, filling said sleeve with the heat fusible oil gel composition comprising from 50 to 80 wt. % of a hydrocarbon oil gel containing from 2 to 10 wt. % of a of an S-EB or S-EP diblock polymer or a mixture thereof, and from 20 to 50 wt. % of a polar oil gel containing 5 to 25 wt. % of an S-EB-S or S-EP-S triblock polymer, or a mixture of thereof. When it is desirable to splice the optic fiber cable, the following steps are to be completed—heating said filled sleeve in an area where the optic fiber waveguide and sleeve are to be cut, until said heat fusible oil gel composition solidifies, and cutting said glass fiber and sleeve in said solidified area to splice it to another spliceable fiber optic cable.

A method of producing a heat fusible oil gel composition for fiber optic cable, comprises:
a) making a gel based on a hydrocarbon oil by mixing from 2 to 10 wt. % of a diblock polymer into the oil for about 30-60 minutes at about 120-140° C. with a high shear mixer,
b) making a gel based on a polar oil by mixing from 5 to 25 wt. % of a triblock polymer into the oil for about 30-60 minutes at about 120-140° C. with a high shear mixer, and
c) mixing about 70 to about 80 wt. % of the gel based on a hydrocarbon oil and about 20 to about 30 wt. % of the gel based on a polar oil at near room temperature with a low shear mixer.

A fiber optic cable using the present invention comprises at least one fiber optic waveguide, a flexible sleeve or sheath, and an oil gel comprising from 50 to 80 wt. % of a hydrocarbon oil gel containing from 2 to 10 wt. % of an S-EB or S-EP diblock polymer or a mixture thereof, and from 20 to 50 wt. % of a polar oil gel containing 5 to 25 wt. % of an S-EB-S or S-EP-S triblock polymer, or a mixture of thereof, positioned between the at least one fiber optic waveguide and the flexible sheath.

EXAMPLES

The following examples are intended to be illustrative only, of the material useful in making the heat fusible oil gel of the present invention.

Example 1

The following heat fusible oil gel composition comprised a 50/50 by weight mixture of a polar oil gel and a hydrocarbon oil gel. The polar oil comprised 80 wt. % CalEster A polar oil and 20 wt. % of the S-EB-S triblock polymer Kraton G1651. The hydrocarbon oil gel comprised 94 wt. % Drakeol 34 mineral oil and 6 wt. % of the S-EP diblock polymer Kraton G1702. A 50/50 wt. % mixture of the polar oil gel and hydrocarbon oil gel was made and Irganox 1010 was added at 0.2 wt. % based on the total weight of the heat fusible oil gel composition. 10 grams of the heat fusible oil gel composition were placed in an aluminum dish and placed in a convection oven. The temperature was increased 20° C. every hour. The results of when gel thickened to a solid are set forth below.
40° C.—liquid
60° C.—liquid
80° C.—liquid
100° C.—liquid
120° C.—liquid
140° C. for 30 min.—solid rubbery flexible gel Example 2

This example is a prophetic example. The following heat fusible oil gel composition comprised a 50/50 by weight mixture of a polar oil gel and a hydrocarbon oil gel. The polar oil gel comprised 80 wt. % Agrol Polyol 2.0 oil and 20 wt. % of the S-EB-S triblock polymer Kraton G1651. The hydrocarbon oil gel comprised 94 wt. % Risella oil and 6 wt. % of the S-EP diblock polymer Kraton G 1702. A 50/50 wt. % mixture of the polar oil gel and hydrocarbon oil gel was made and Irganox 1010 was added at 0.2 wt. % based on the total weight of the heat fusible oil gel composition. 10 grams of this composition were placed in an aluminum pan and placed in a convection oven. After heating for about 30-60 minutes at about 120-140° C., the composition fused becoming a coherent rubbery gel.

Example 3

In this example, a comparison was made of 2 different thixotropic agents which were employed to retard phase separation of the polymer and the oil in the polar oil gel composition. The results are reported in Table 1.

TABLE 1

Approaches to Retard Phase Separation of Kraton G1651 in CalEster A

| | Composition, % w | | | | | |
|---|---|---|---|---|---|---|
| | 1 | 2 | 3 | 4 | 5 | 6 |
| CalEster A | 83 | 81 | 83.8 | 83 | 82.5 | 83.5 |
| Kraton G1651 | 16 | 16 | 16 | 16 | 16 | 16 |
| Cabosil M5 | 1 | 3 | | | 1.5 | |
| Bentone SD-2 | | | 0.2 | 1 | | 0.5 |
| Comments | | | | | | |
| Phase separation | quick | none * | quick | none * | none * | 5% |
| Viscosity, cps | nice | much too thick | nice | thixotropic even warm | 480 | 380 |

* Separation after 1 week storage at RT.

As noted from Table 1, compositions 2, 4, and 5 had no phase separation. Compositions 1 and 3 separated quickly after being blended together. Cabosil employed in the composition at 1.5 and 3 wt. % level showed no phase separation. Likewise employing at least 1 wt. % bentonite clay in the composition showed no phase separation. Composition 5 showed the best performance in that it showed no separation after 1 week storage and yet it had a viscosity in the right range for easy mixing, pouring and pumping.

Example 4

In this example, a conventional fiber optic oil gel (Composition 1) and a polar oil gel consisting of 16 wt. % Kraton G1651 in CalEster A (Composition 2) were prepared. Viscosities were measured with a Brookfield model DV-II+ Pro cone and plate viscometer with a CPA-52Z cone spindle. Viscosities measured on the conventional gel show the large dependence of viscosity on shear rate that is required in a fiber optic gel. The polar oil gel was then blended as a modifier into the conventional oil gel at ratios by weight of 70/30, 75/25 and 80/20. Results of the viscosity measurements on these blends show that adding this modifier does not substantially change the rheology of the conventional gel. All five blends have grease-like consistency at room temperature. After Compositions 3, 4 and 5 were heated for 30 minutes at 120° C., all three blends changed from being a grease to being a rubbery solid having a ring and ball softening point near 100° C. This demonstrates the invention that addition of the polar oil gel to a conventional hydrocarbon oil gel results in a modified gel that has the consistency of grease but, after heating, it fuses to a rubbery solid.

TABLE 2

Feasibility Demonstration of Heat Fusible FOC Gel with Kraton G1651

| | Composition, % w | | | | |
|---|---|---|---|---|---|
| | 1 | 2 | 3 | 4 | 5 |
| Drakeol 34 | 88.27 | | | | |
| Kraton G1701 | 6.12 | | | | |
| Cabosil TS 720 | 5.61 | | | | |
| CalEster A | | 84.0 | | | |
| Kraton G1651 | | 16.0 | | | |
| Irganox 1010 | 0.20 | 0.2 | | | |
| Ratio of Blend 1/Blend 2 | | | 70/30 | 75/25 | 80/20 |

| Shear Rate, sec$^{-1}$ | Brookfield Viscosity at 25° C., cps | | | | |
|---|---|---|---|---|---|
| 25 | | | | | |
| 12.5 | 13200 | 9900 | 10700 | 10700 | |
| 5 | 20500 | 15800 | 17100 | 17200 | |
| 2.5 | 28900 | 22500 | 24600 | 24600 | |
| 1.25 | 36500 | 32100 | 36200 | 36000 | |
| 0.625 | 42200 | 46300 | 54900 | 54600 | |
| 0.25 | 117000 | 80200 | 99200 | 98400 | |
| 0.125 | 189000 | | | 159000 | |

| Properties of Fused Gel* | | | | | |
|---|---|---|---|---|---|
| Softening Pt, ° C. | | | 100 | 103 | 97 |
| Hardness | | | soft, elastic | soft, elastic | very soft |
| Oil bleed | | | slight | none | sticky |

*Blends were fused for 30 minutes at 120° C.

Example 5

This example is the same as Example 4 except that Kraton G1633 is used to make the polar oil gel. Results demonstrate that the behavior of the two S-EB-S polymers is very similar except that Kraton G1633 gives a heat fused gel having a softening point about 20° C. higher.

TABLE 3

Feasibility Demonstration of Heat Fusible FOC Gel with Kraton G1633

| | Composition, % w | | | | |
|---|---|---|---|---|---|
| | 1 | 2 | 3 | 4 | 5 |
| Drakeol 34 | 88.27 | | | | |
| Kraton G1701 | 6.12 | | | | |
| Cabosil TS 720 | 5.61 | | | | |
| CalEster A | | 84.0 | | | |
| Kraton G1633 | | 16.0 | | | |
| Irganox 1010 | 0.20 | 0.2 | | | |
| Ratio of Blend 1/Blend 2 | | | 70/30 | 75/25 | 80/20 |

| Shear Rate, sec$^{-1}$ | Brookfield Viscosity at 25° C., cps | | | | |
|---|---|---|---|---|---|
| 25 | | 365 | | | |
| 12.5 | 12200 | | 13600 | 13300 | 14700 |
| 5 | 19400 | | 21600 | 20700 | 23400 |
| 2.5 | 27400 | | 31000 | 29700 | 33400 |
| 1.25 | 40000 | | 45400 | 43500 | 48400 |
| 0.625 | 60300 | | 67300 | 64800 | 72700 |
| 0.25 | 109000 | | 116000 | 114000 | 129000 |
| 0.125 | 176000 | | 181000 | 179000 | 205000 |

| Properties of Fused Gel* | | | | | |
|---|---|---|---|---|---|
| Softening Pt, ° C. | | | 119 | 119 | 126 |
| Hardness | | | soft, elastic | soft, elastic | v soft, elastic |
| Oil bleed | | | slight | slight | sticky |

*Blends were fused for 30 minutes at 120° C.

Thus it is apparent that there has been provided, in accordance with the invention, a heat fusible oil gel comprising a mixture of: 1) a hydrocarbon oil gel containing a mineral oil and an SEP or SEB diblock polymer, or a mixture thereof, with 2) a polar oil gel containing a polar oil and an SEBS or SEPS triblock polymer or a mixture thereof, wherein the blend has a grease-like consistency during normal uses, such as in an optical fiber cable, but will solidify upon heating to permit splicing and grafting of the optical fiber cable. Also a process for making an oil gel composition for optical fiber cables is disclosed. Additionally, a method of making a spliceable optical fiber cable is disclosed. Lastly an optical fiber cable is claimed which incorporates a blend of a hydrogenated styrenic diblock copolymer with mineral oil and a hydrogenated styrenic triblock copolymer with polar oil. These inventions fully satisfy the objects, aims, and advantages set forth herein. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A heat fusible oil gel composition comprising:
   a) from 50 to 80 wt. % of a gel based on a hydrocarbon oil containing from 2 to 10 wt. % of an S-EB or S-EP diblock copolymer, or a mixture thereof, and
   b) from 20 to 50 wt. % of a gel based on a polar oil containing from 5 to 25 wt. % of an S-EB-S or S-EP-S triblock copolymer, or a mixture thereof, where S, EB, and EP represent blocks of polystyrene, hydrogenated polybutadiene and hydrogenated polyisoprene, respectively, and wherein said hydrocarbon oil is an aromatic-free oil containing paraffinic and/or naphthenic species.

2. The heat fusible oil gel composition of claim 1 wherein said polar oil is an ether, ester or ketone oil.

3. The heat fusible oil gel composition of claim 1 wherein said polar oil is hydroxylated soybean oil or an ester of pentaerythritol and linear saturated fatty acids.

4. A method of producing a heat fusible oil gel composition comprising:
   a) making a gel based on a hydrocarbon oil by mixing from 2 to 10 wt. % of a diblock polymer into the oil for about 30-60 minutes at about 120-140° C. with a high shear mixer,
   b) making a gel based on a polar oil by mixing from 5 to 25 wt. % of a triblock polymer into the oil for about 30-60 minutes at about 120-140° C. with a high shear mixer, and c) mixing about 50 to about 80 wt. % of the gel based on a hydrocarbon oil and about 20 to about 50 wt. % of the gel based on a polar oil at near room temperature with a low shear mixer.

5. A method of producing a spliceable fiber optic cable that can be easily spliced without spilling oil comprising:
placing a fiber optic waveguide into a flexible sleeve,
filling said sleeve with said heat fusible oil gel composition of claim 1,
when it is desirable to splice the optic fiber cable, the following steps are completed heating said filled sleeve in an area where the optical fiber waveguide and sleeve are to be cut, until said heat fusible oil gel composition solidifies, and
cutting said glass fiber and sleeve in said solidified area to splice it to another spliceable fiber optic cable.

6. The method of claim 5 wherein said heating is conducted at a temperature between about 120 and 150° C. for between about 5 and 60 minutes.

7. A fiber optic cable comprising: at least one fiber optic wave guide, a flexible sheath surrounding said at least one fiber optic wave guide and a heat fusible oil gel composition of claim 1 within said sheath, surrounding said at least one fiber optic wave guide.

8. A method of producing a spliceable fiber optic cable comprising:
placing at least one fiber optic waveguide into a flexible sleeve,
filling said sleeve with a heat fusible oil gel composition comprising 50 to 80 wt. % of a hydrocarbon oil gel containing from 2 to 10 wt. % of an S-EB or S-EP diblock polymer or a mixture thereof, and from 20 to 50 wt. % of a polar oil gel containing 5 to 25 wt. % of an S-EB-S or S-EP-S triblock polymer, or a mixture of these,
wherein said heat fusible oil gel is positioned between the at least one fiber optic waveguide and the flexible sleeve.

9. The heat fusible oil gel composition of claim 1 wherein S has a molecular weight from 3.0 to about 60 kg/mol, EB has a molecular weight from 30 to about 300 kg/mol, and EP has a molecular weight from about 30 to about 300 kg/mol.

10. The heat fusible oil gel composition of claim 1 wherein the amount of styrene of the triblocks copolymer is greater than about 20 wt. %.

11. The heat fusible oil gel composition of claim 1 wherein the amount of styrene in the diblock copolymer is from about 28 to about 30 wt. %.

12. The heat fusible oil gel composition of claim 1 wherein the diblock copolymer and triblock copolymer have been selectively hydrogenated and at least about 95% of the EB and EP double bonds have been reduced and between 0 and 10% of the styrene double bonds have been reduced.

13. The heat fusible oil gel composition of claim 1 wherein the vinyl content of the EB block is from about 30 to about 80 mol %.

14. The heat fusible oil gel composition of claim 1 wherein the hydrocarbon oil is a mineral oil or a synthetic oil.

15. The heat fusible oil gel composition of claim 1 wherein the gel based on a hydrocarbon oil further comprises a hydrophobic fumed silica in an amount up to about 7.5 wt. % based on the weight of the hydrocarbon oil gel.

16. The heat fusible oil gel composition of claim 1 wherein the gel based on a polar oil further comprises a hydrophilic fumed silica in an amount up to about 2.5 wt. % based on the weight of the polar oil gel.

17. The method of claim 4 wherein the diblock copolymer is S-EB or S-EP where S is a block of polystyrene, EB is a block of hydrogenated polybutadiene, and EP is a block of hydrogenated polyisoprene.

18. The method of claim 4 wherein the triblock copolymer is S-EB-S or S-EP-S where S is a block of polystyrene, EB is a block of hydrogenated polybutadiene, and EP is a block of hydrogenated polyisoprene.

19. The method of claim 4 wherein the hydrocarbon oil is an aromatic-free oil containing paraffinic and/or naphthenic species and is a mineral oil or a synthetic oil and the polar oil is an ether, ester or ketone oil.

* * * * *